US012211382B2

(12) United States Patent
Eguchi

(10) Patent No.: US 12,211,382 B2
(45) Date of Patent: Jan. 28, 2025

(54) TRAVELING VEHICLE SYSTEM

(71) Applicant: Murata Machinery, Ltd., Kyoto (JP)

(72) Inventor: Yuya Eguchi, Mie (JP)

(73) Assignee: MURATA MACHINERY, LTD., Kyoto (JP)

( * ) Notice: Subject to any disclaimer, the term of this patent is extended or adjusted under 35 U.S.C. 154(b) by 283 days.

(21) Appl. No.: 17/745,413

(22) Filed: May 16, 2022

(65) Prior Publication Data

US 2022/0375346 A1 Nov. 24, 2022

(30) Foreign Application Priority Data

May 19, 2021 (JP) ................................ 2021-084595

(51) Int. Cl.
*G08G 1/127* (2006.01)
*G08G 1/01* (2006.01)

(52) U.S. Cl.
CPC ........... *G08G 1/127* (2013.01); *G08G 1/0104* (2013.01)

(58) Field of Classification Search
CPC .... G08G 1/127; G08G 1/0104; G08G 1/0145; G08G 1/065; B60W 60/001
See application file for complete search history.

(56) References Cited

U.S. PATENT DOCUMENTS 9,829,333 B1 * 11/2017 Calder .................. G06Q 10/08
11,158,017 B2 * 10/2021 Yao ...................... G01C 21/206
2008/0051985 A1 * 2/2008 D'Andrea ............ G05D 1/0291 701/410
2011/0125350 A1 * 5/2011 Won .................... B61L 15/0072 701/20
2013/0317642 A1 * 11/2013 Asaria .................... G06Q 10/08 700/216
2014/0358338 A1 * 12/2014 Harasaki ............... B61L 23/042 701/19
2016/0101940 A1 * 4/2016 Grinnell ............... G05D 1/0289 700/218
2018/0239343 A1 * 8/2018 Voorhies .............. G05D 1/0234
2018/0299882 A1 * 10/2018 Kichkaylo ........... G05D 1/0289
2020/0089237 A1 * 3/2020 Whitaker ............. G05D 1/0088
2020/0246972 A1 * 8/2020 Johnson ................. B25J 9/1666
2020/0271462 A1 8/2020 Ida et al.
2021/0018912 A1 * 1/2021 Dymesich ............ G05D 1/0225
2021/0252705 A1 * 8/2021 Liu ...................... G05D 1/0044
(Continued)

FOREIGN PATENT DOCUMENTS

JP 2002-351546 12/2002
WO 2017/115586 A1 7/2017
WO 2020/261772 A1 12/2020

*Primary Examiner* — Jason Holloway
*Assistant Examiner* — Madison B Emmett
(74) *Attorney, Agent, or Firm* — Keating & Bennett, LLP

(57) ABSTRACT

A controller monitors the number of traveling vehicles scheduled to enter a sectioned area in addition to the number of existing vehicles, determines whether the traveling vehicles, scheduled to enter the sectioned area when the total of the number of existing vehicles and the number of vehicles scheduled to enter the sectioned area is acquired, can enter the sectioned area based on the total number of vehicles, determines whether a route including the sectioned area in a traveling route can be newly set, and controls the traveling of the traveling vehicle based on the determination on the entry and the determination on the setting.

3 Claims, 5 Drawing Sheets

(56) References Cited

U.S. PATENT DOCUMENTS

| | | | | |
|---|---|---|---|---|
| 2022/0229447 | A1 | 7/2022 | Harasaki | |
| 2022/0332508 | A1* | 10/2022 | Winkler | B65G 1/1378 |
| 2023/0259878 | A1* | 8/2023 | Jacquemart | G06Q 10/087 705/28 |
| 2023/0339686 | A1* | 10/2023 | Li | B65G 1/1376 |
| 2023/0384798 | A1* | 11/2023 | Harasaki | G05D 1/0297 |
| 2024/0310860 | A1* | 9/2024 | Van De Velde | G05D 1/6987 |

* cited by examiner

FIG. 3

| SCENE (LIMITED NUMBER OF VEHICLES: 5) | | | CONTROL |
|---|---|---|---|
| 1 | 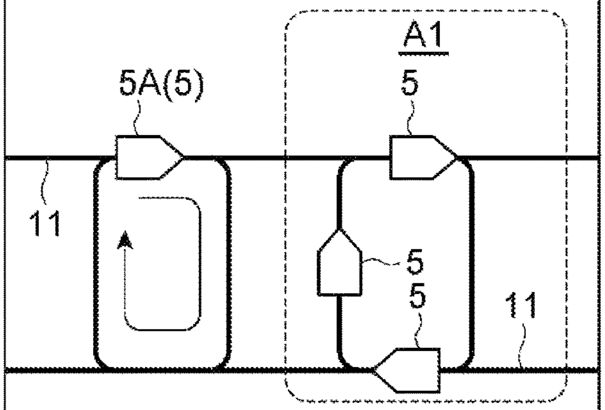 | NUMBER OF EXISTING VEHICLES: 3<br>NUMBER OF ENTRY SCHEDULED VEHICLES: 0<br><br>TOTAL NUMBER OF VEHICLES: 3 | NORMAL |
| 2 | 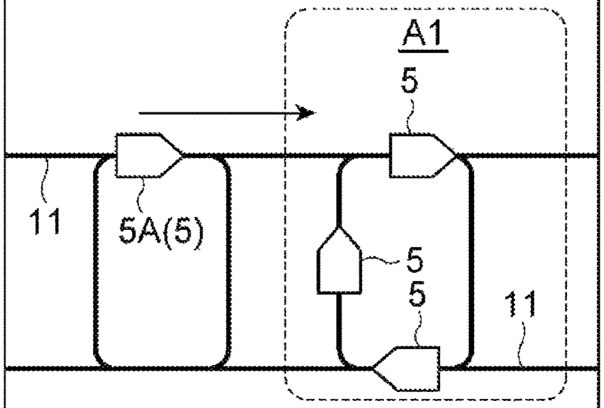 | NUMBER OF EXISTING VEHICLES: 3<br>NUMBER OF ENTRY SCHEDULED VEHICLES: 1<br><br>TOTAL NUMBER OF VEHICLES: 4 | ACTIVATE FIRST PRELIMINARY CONTROL |
| 3 | 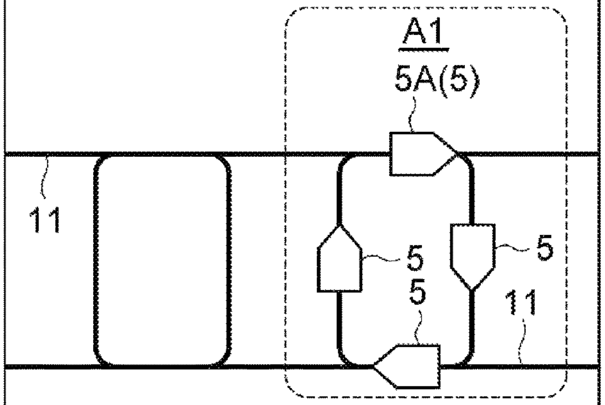 | NUMBER OF EXISTING VEHICLES: 4<br>NUMBER OF ENTRY SCHEDULED VEHICLES: 0<br><br>TOTAL NUMBER OF VEHICLES: 4 | FIRST PRELIMINARY CONTROL |

FIG. 4

| SCENE (LIMITED NUMBER OF VEHICLES: 5) | | | LIMIT NUMBER OF VEHICLES |
|---|---|---|---|
| 4 | 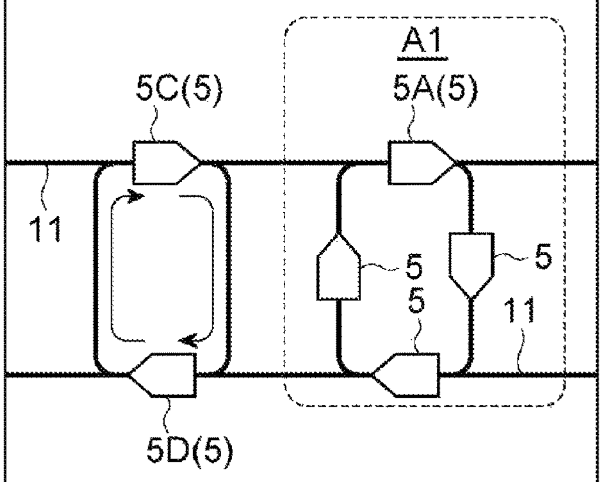 | NUMBER OF EXISTING VEHICLES: 4<br>NUMBER OF ENTRY SCHEDULED VEHICLES: 0<br><br>TOTAL NUMBER OF VEHICLES: 4 | FIRST PRELIMINARY CONTROL |
| 5 | 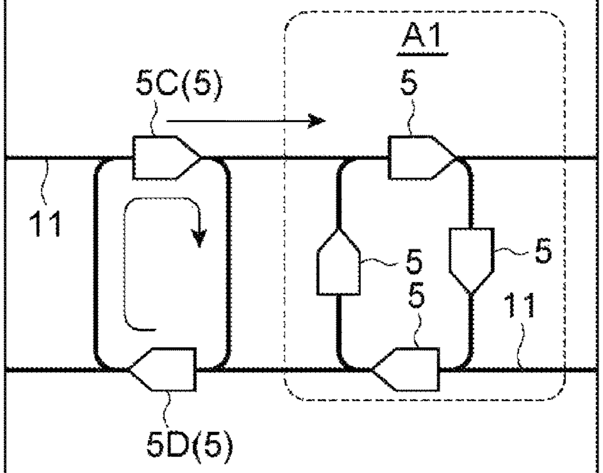 | NUMBER OF EXISTING VEHICLES: 4<br>NUMBER OF ENTRY SCHEDULED VEHICLES: 1<br><br>TOTAL NUMBER OF VEHICLES: 5 | ACTIVATE SECOND PRELIMINARY CONTROL |
| 6 | 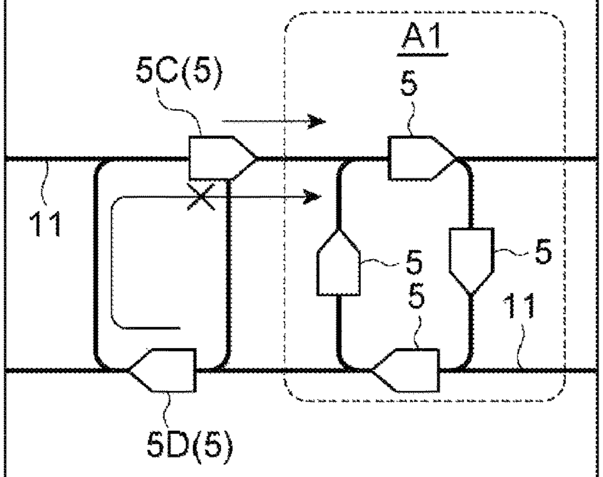 | NUMBER OF EXISTING VEHICLES: 4<br>NUMBER OF ENTRY SCHEDULED VEHICLES: 1<br><br>TOTAL NUMBER OF VEHICLES: 5 | SECOND PRELIMINARY CONTROL |

FIG. 5
| SCENE (LIMITED NUMBER OF VEHICLES: 5) | | | CONTROL |
|---|---|---|---|
| 7 | 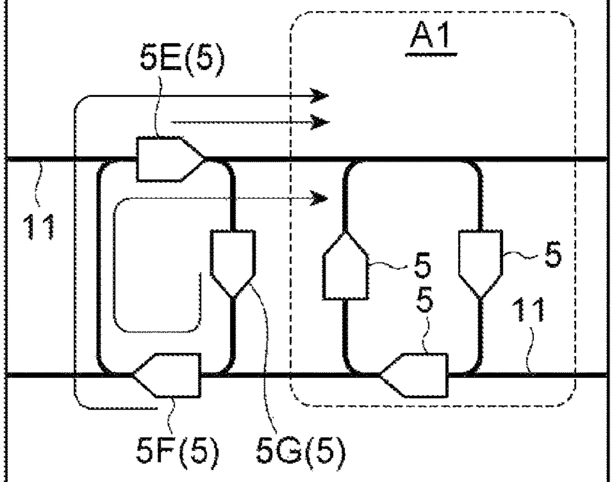 | NUMBER OF EXISTING VEHICLES: 3<br>NUMBER OF ENTRY SCHEDULED VEHICLES: 3<br><br>TOTAL NUMBER OF VEHICLES: 6 | ACTIVATE SECOND PRELIMINARY CONTROL |
| 8 | 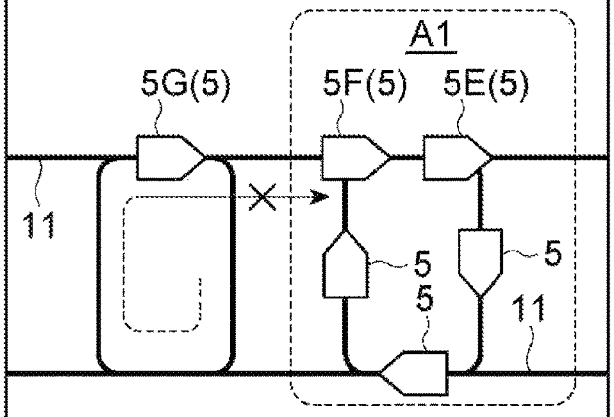 | NUMBER OF EXISTING VEHICLES: 5<br>NUMBER OF ENTRY SCHEDULED VEHICLES: 1<br><br>TOTAL NUMBER OF VEHICLES: 6 | ACTIVATE ENTRY RESTRICTION CONTROL |

TRAVELING VEHICLE SYSTEM

BACKGROUND OF THE INVENTION

1. Field of the Invention

The present invention relates to a traveling vehicle system.

2. Description of the Related Art

There is known a traveling vehicle system (e.g., Japanese Unexamined Patent Publication No. 2002-351546) in which a plurality of traveling vehicles are caused to automatically travel by computer control on a traveling route provided in advance on a ceiling, a floor surface, or the like. The traveling vehicle in the traveling vehicle system travels by power supplied from a power source. With this power source having a limited power supply capability, a plurality of areas to which power is supplied from one power source has been set. However, when a predetermined number or more of traveling vehicles enter one sectioned area, the supply of power to each traveling vehicle becomes insufficient, and the trouble that each traveling vehicle decreases its speed or stops occurs. Therefore, conventionally, the number of traveling vehicles that can enter each sectioned area (hereinafter referred to as "the number of existing vehicles") is limited to a preset number.

BRIEF SUMMARY OF THE INVENTION

However, when the number of existing vehicles reaches a predetermined number and the entry of the traveling vehicles into the corresponding sectioned area is prohibited, for example, the following traveling vehicles stagnate in a row due to the traveling vehicles stopping in front of the sectioned area, or the traveling vehicles trying to avoid the sectioned area concentrate on the same route, and the transport efficiency of the traveling vehicle system decreases, which causes a new problem that the transportation efficiency of the traveling vehicle system decreases.

Therefore, an object of one aspect of the present invention is to provide a traveling vehicle system in which the number of existing vehicles in a sectioned area is limited to a predetermined number of vehicles, the traveling vehicle system being capable of reducing a situation where entry of a traveling vehicle into the sectioned area is restricted and preventing a decrease in transport efficiency.

A traveling vehicle system according to one aspect of the present invention is a traveling vehicle system in which at least one sectioned area is set on a traveling route where a traveling vehicle travels, the traveling vehicle system including a controller that restricts entry of the traveling vehicle into the sectioned area upon the number of existing traveling vehicles in the sectioned area reaching a first predetermined value. The controller monitors the number of traveling vehicles scheduled to enter the sectioned area in addition to the number of existing traveling vehicles, determines whether the traveling vehicle, scheduled to enter the sectioned area when the total of the number of existing traveling vehicles and the number of traveling vehicles scheduled to enter is acquired, can enter the sectioned area based on the total number of traveling vehicles, determines whether a route including the sectioned area in the traveling route can be newly set, and controls traveling of the traveling vehicle based on the determination on the entry and the determination on the setting.

In the traveling vehicle system with this configuration, in addition to the number of existing vehicles, the number of traveling vehicles scheduled to enter the sectioned area is monitored, and it is determined whether the traveling vehicle scheduled to enter the sectioned area can enter the sectioned area based on a new index which is the total of the number of existing vehicles and the number of entry scheduled vehicles, and it is determined whether a route including the sectioned area in the traveling route can be newly set. As a result, it is possible to execute appropriate measures for inhibiting entry of a traveling vehicle into the sectioned area in accordance with the degree of urgency until the number of existing vehicles reaches the first predetermined value. As a result, in the traveling vehicle system in which the number of existing vehicles in the sectioned area is limited to the predetermined number of vehicles, it is possible to reduce a situation where entry of a traveling vehicle into the sectioned area is restricted, and to prevent a decrease in transport efficiency.

In the traveling vehicle system according to one aspect of the present invention, upon the total number of traveling vehicles reaching a second predetermined value smaller than the first predetermined value or a predetermined ratio with respect to the first predetermined value, the controller may allow the traveling vehicle, scheduled to enter the sectioned area when the total number of traveling vehicles reaches the second predetermined value or the predetermined ratio, to enter the sectioned area as scheduled, and at the time of newly setting the traveling route, the controller may set a priority of the traveling route bypassing the sectioned area to be higher than a priority of the traveling route entering the sectioned area. With this configuration, it is possible to relatively slowly reduce the situation where the entry of the traveling vehicle into the sectioned area is restricted.

In the traveling vehicle system according to one aspect of the present invention, upon the total number of traveling vehicles reaching the first predetermined value or becoming equal to or larger than the first predetermined value, the controller may allow the traveling vehicle, scheduled to enter the sectioned area when the total number of traveling vehicles reaches the first predetermined value or becomes equal to or larger than the first predetermined value, to enter the sectioned area as scheduled, and prohibits a new setting of the traveling route entering the sectioned area. With this configuration, it is possible to relatively quickly reduce the situation where entry of a traveling vehicle into the sectioned area is restricted.

In the traveling vehicle system according to one aspect of the present invention, upon the total number of traveling vehicles reaching a second predetermined value smaller than the first predetermined value or a predetermined ratio with respect to the first predetermined value, the controller may allow the traveling vehicle, scheduled to enter the sectioned area when the total number of traveling vehicles reaches the second predetermined value or the predetermined ratio, to enter the sectioned area as scheduled, and at a time of newly setting the traveling route, the controller may set a priority of the traveling route bypassing the sectioned area to be higher than a priority of the traveling route entering the sectioned area, and upon the total number of traveling vehicles reaching the first predetermined value or becoming equal to or larger than the first predetermined value, the controller may allow the traveling vehicle, scheduled to enter the sectioned area when the total number of traveling vehicles reaches the first predetermined value or becomes equal to or larger than the first predetermined value, to enter the sectioned area as scheduled, and may prohibit a new setting of the traveling route entering the sectioned area. With this configuration, when the degree of urgency until the number of existing vehicles reaches the first predetermined value is low, it is possible to relatively slowly reduce the situation where the entry of the traveling vehicle into the sectioned area is restricted, and when the degree of urgency until the number of existing vehicles reaches the first predetermined value is high, it is possible to relatively quickly reduce the situation where the entry of the traveling vehicle into the sectioned area is restricted. That is, it is possible to take appropriate measures for inhibiting the entry of the traveling vehicle into the corresponding sectioned area in accordance with the degree of urgency until the number of existing vehicles reaches the first predetermined value.

In the traveling vehicle system according to one aspect of the present invention, the controller may be provided to be able to set a range of the sectioned area. With this configuration, the range of the sectioned area can be freely set according to the operating state.

According to one aspect of the present invention, in the traveling vehicle system in which the number of existing vehicles in the sectioned area is limited to the predetermined number of vehicles, it is possible to reduce a situation where entry of a traveling vehicle into the sectioned area is limited, and to prevent a decrease in transport efficiency.

BRIEF DESCRIPTION OF THE DRAWINGS

FIG. 3 is a diagram for describing an example of a flow until the traveling vehicle system activates a first preliminary control;

FIG. 4 is a diagram for describing an example of a flow until the traveling vehicle system activates a second preliminary control; and FIG. 5 is a diagram for describing an example of a flow until the traveling vehicle system activates entry restriction control.

DETAILED DESCRIPTION OF PREFERRED EMBODIMENT

Figure 1:
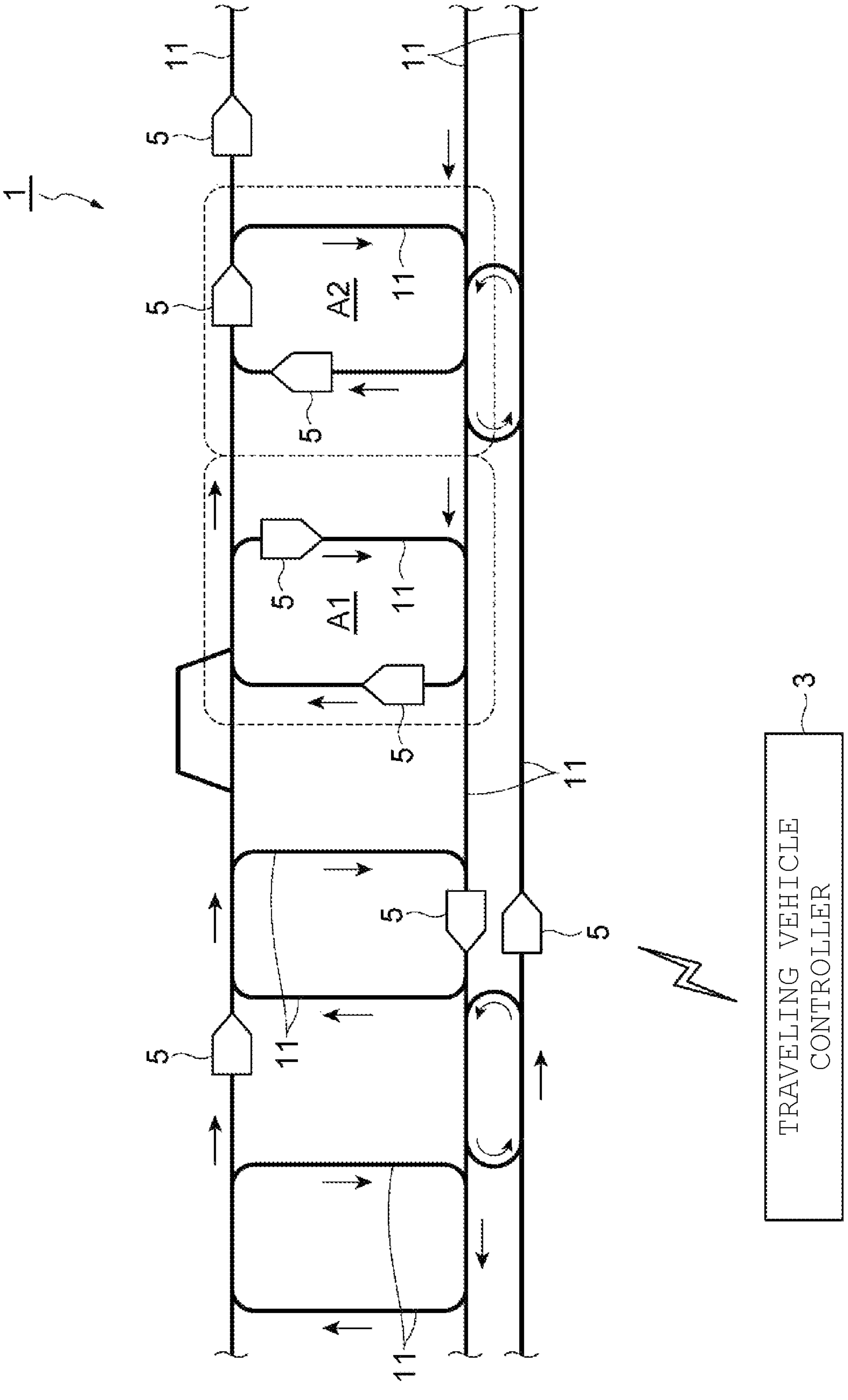
FIG. 1 is a configuration diagram illustrating a configuration of a traveling vehicle system according to one embodiment.

Hereinafter, one embodiment will be described with reference to the drawings. In descriptions of the drawings, the same elements are provided with the same reference numerals, and a repeated description is omitted. A dimensional ratio of the drawing does not necessarily coincide with that in the description.

The traveling vehicle system 1 is a system for transporting an article by using a traveling vehicle 5 that is movable along a track (a traveling route). The traveling vehicle 5 is an unmanned traveling vehicle and is, for example, an overhead traveling vehicle, a guided vehicle, or the like. Here, in a factory or the like, a traveling vehicle system 1 in which the overhead traveling vehicle 5 (hereinafter simply referred to as a "traveling vehicle 5") travels along a one-way track laid on a ceiling or the like of the factory will be described as an example. As illustrated in FIG. 1, the traveling vehicle system 1 mainly includes a track 11, a plurality of stations (not illustrated), a plurality of traveling vehicles 5, and a traveling vehicle controller 3.

The track 11 is a member for guiding the traveling vehicle 5 and causing the traveling vehicle 5 to travel and is suspended from the ceiling. FIG. 1 illustrates a layout of the track 11 in the present embodiment.

The station is provided along the track 11. The station is a part where an article is transferred to and from the traveling vehicle 5. For example, examples of the station in a semiconductor processing factory include a load port for delivering a front opening unified pod (FOUP) between a semiconductor processing apparatus and the traveling vehicle 5, a buffer on which the traveling vehicle 5 can temporarily place the FOUP, and the like.

Figure 2:
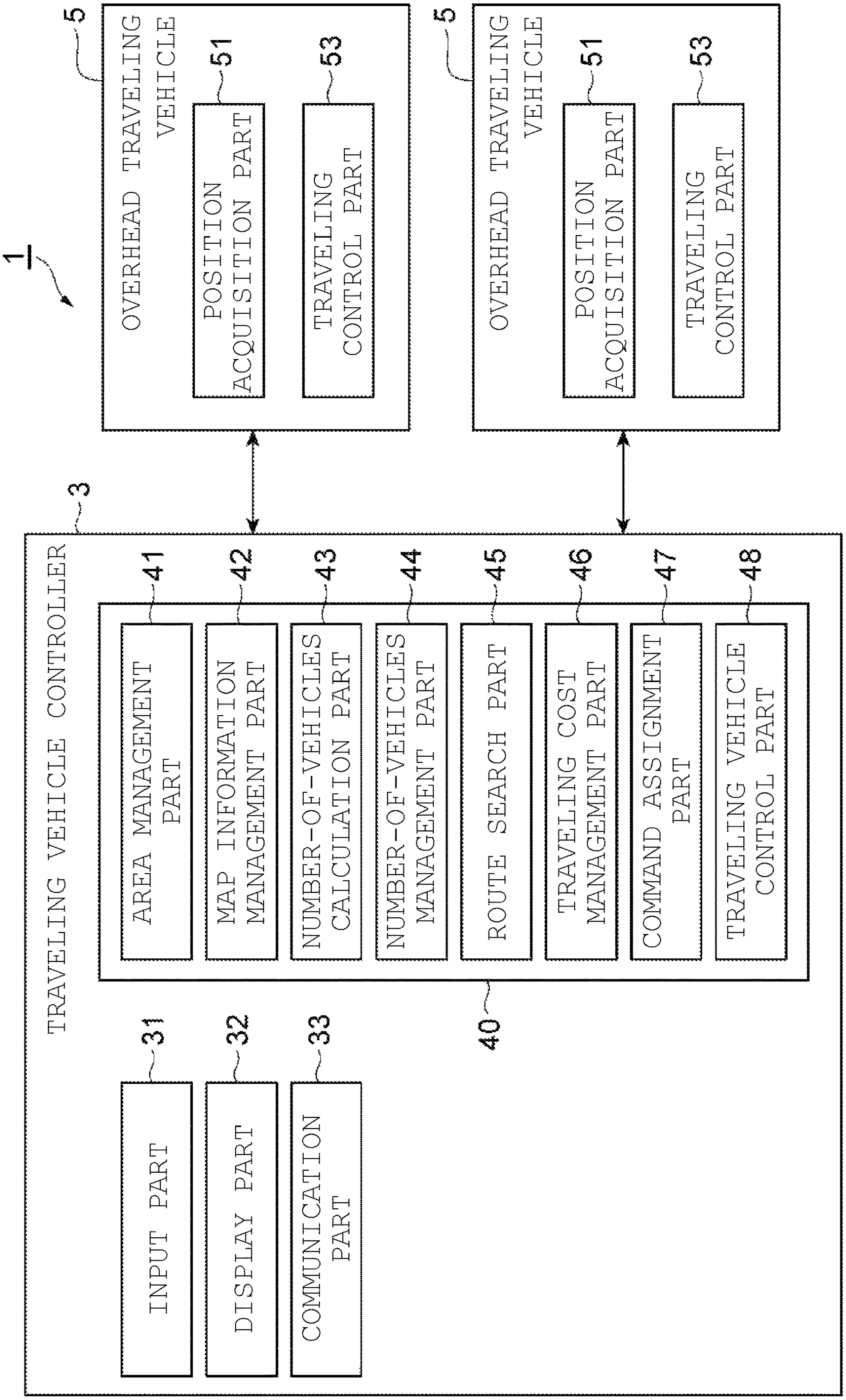
FIG. 2 is a functional block diagram illustrating a functional configuration of the traveling vehicle system of FIG. 1.

The traveling vehicle 5 is configured to be able to transfer an article. As illustrated in FIG. 2, the traveling vehicle 5 includes a position acquisition part 51 and a traveling control part 53 in addition to a mechanism for transferring an article.

The position acquisition part 51 is a part for acquiring the position of the host vehicle on the track 11. The position acquisition part 51 may include, for example, a reader that reads a barcode or the like indicating point information attached to the track 11, an encoder, and the like. The position acquisition part 51 transmits, to the traveling vehicle controller 3, position data including the point information obtained by the reader and a travel distance after passage through the point obtained from the encoder.

The traveling control part 53 is a part for controlling the traveling of the traveling vehicle 5 and is, for example, an electronic control unit including a central processing unit (CPU), a read-only memory (ROM), a random-access memory (RAM), and the like. The traveling control part 53 controls the traveling of the traveling vehicle 5 based on a transport command transmitted from the traveling vehicle controller 3.

The traveling vehicle controller 3 is a part for managing a plurality of traveling vehicles 5 in areas (sectioned areas) A1, A2. As illustrated in FIG. 2, the traveling vehicle controller 3 includes an input part 31, a display part 32, a communication part 33, and a control part 40. The input part 31 is a part to which various operations and various setting values are input by an operator. The display part 32 includes, for example, a liquid crystal display or the like and is a part for displaying various setting screens or displays an input screen or the like that causes an operator to input a setting value or the like via the input part 31 or the like.

The communication part 33 is a part for communicating with other devices and the like, and for example, the communication part 33 transmitting a transport command to the traveling vehicle 5 via a wireless communication network and receiving, from the traveling vehicle 5, information on the current position of the traveling vehicle 5 and whether there is loading of an object to be transported. The communication part 33 also receives a transport instruction including information on a station to be a start point (a source of movement) and/or an end point (a destination of movement) from a host controller via a local area network (LAN), for example.

The control part 40 is a part for executing various control processes in the traveling vehicle system 1 described in detail later and is, for example, an electronic control unit including a CPU, a ROM, a RAM, and the like. The control part 40 includes an area management part 41 as a conceptual part that executes various control processes in the traveling vehicle system 1, a map information management part 42, a number-of-vehicles calculation part 43, a number-of-vehicles management part 44, a route search part 45, a traveling cost management part 46, a command assignment part 47, and a traveling vehicle control part 48. The area management part 41, the map information management part 42, the number-of-vehicles calculation part 43, the number-of-vehicles management part 44, the route search part 45, the traveling cost management part 46, the command assignment part 47, and the traveling vehicle control part 48 formed as such conceptual parts can be configured as software in which, for example, a program stored in the ROM is loaded on the RAM and executed by the CPU. Note that the control part 40 may be configured as hardware including an electronic circuit or the like.

Hereinafter, each configuration of the traveling vehicle controller 3 will be described in detail.

The area management part 41 is a part for setting a sectioned area A (e.g., sectioned areas A1, A2) as illustrated in FIG. 1 with respect to the track 11 laid down in a factory or the like. The area management part 41 sets the sectioned area A for the track 11 stored in the map information management part 42. In other words, the area management part 41 sets the range of the track 11 to which each sectioned area A belongs. The area management part 41 can freely set a range of the sectioned area A (the range of the track 11 belonging to the sectioned area A) based on, for example, the amount of power that can be supplied by the power source and/or a communication capacity capable of stable communication. The sectioned area A is set before the traveling vehicle system 1 starts to operate.

The map information management part 42 is a part for storing map information. The map information is information on the track 11, the stations, and the sectioned areas A, and more specifically, is information on a laying status (a layout) of the track 11, an arrangement position of the stations, and the range of the track 11 for each sectioned area A. The laying status of the track 11 is indicated by a plurality of nodes and a plurality of links. The arrangement position of the station is indicated in association with the node or the position set for each node. The range of the sectioned area A is indicated in a state where the information for specifying the node and/or the link is associated with each sectioned area A.

The number-of-vehicles calculation part 43 is a part for monitoring, for each of the sectioned areas A, the number of existing traveling vehicles 5 in the area (hereinafter also referred to as "the number of existing vehicles"). The number-of-vehicles calculation part 43 acquires position information of the traveling vehicles 5 based on information periodically or continuously transmitted from the position acquisition part 51 of each traveling vehicle 5 and calculates the number of existing traveling vehicles 5 in each of the sectioned areas A based on the position information. Further, the number-of-vehicles calculation part 43 monitors the number of traveling vehicles 5 scheduled to enter each sectioned area A (hereinafter also referred to as "the number of entry scheduled traveling vehicles"). The number-of-vehicles calculation part 43 derives the number of entry scheduled vehicles by referring to a traveling route searched by the route search part 45 to be described later in detail. Note that the traveling route searched by the route search part 45 is temporarily stored in a storage, such as the route search part 45 or the map information management part 42, until the transport based on the transport command is completed. The number-of-vehicles calculation part 43 calculates the total of the number of existing vehicles and the number of entry scheduled vehicles, calculated as described above. The number of existing vehicles, the number of entry scheduled vehicles, and the total of the number of existing vehicles and the number of entry scheduled vehicles, calculated by the number-of-vehicles calculation part 43, are managed by the number-of-vehicles management part 44.

The number-of-vehicles management part 44 stores the number of existing vehicles, the number of entry scheduled vehicles, and the total of the number of existing vehicles and the number of entry scheduled vehicles calculated by the number-of-vehicles calculation part 43. The number-of-vehicles management part 44 may partially include a storage configured with hardware such as a solid-state drive (SSD) or a hard disk drive (HDD).

The route search part 45 is a part for searching and setting a traveling route on which the traveling vehicle 5 is caused to travel to a predetermined station included in the transport command. When a transport command from the host controller (not illustrated) is received or when route re-search is required at the time of the entry restriction control, the route search part 45 searches a traveling route on which the traveling vehicle 5 is caused to travel to a predetermined station included in the transport command based on the map information stored in the map information management part 42 and cost (a priority) of each node (traveling route) managed by the traveling cost management part 46, for example, and the route search part 45 sets the searched traveling route to the traveling vehicle 5.

The traveling cost management part 46 is a part for managing the cost (the priority) of each node (traveling route). The traveling cost management part 46 switches the cost of the traveling route (each node) each time of first preliminary control and second preliminary control to be described later in detail. Specifically, at the time of the first preliminary control, the traveling cost management part 46 sets cost of a traveling route bypassing the sectioned area A lower (sets a priority thereof higher) than cost of the traveling route entering the sectioned area A so that the traveling route entering the sectioned area A is less likely to be selected. The traveling cost management part 46 sets the cost of the traveling route entering the sectioned area A relatively high (sets the priority thereof relatively low) so that the traveling route entering the sectioned area A is not selected. The traveling cost management part 46 may partially include a storage configured with hardware such as a solid-state drive (SSD) or a hard disk drive (HDD).

The command assignment part 47 is a part for selecting the traveling vehicle 5, on which the transport command is executed, from among the plurality of traveling vehicles 5. The transport command is transmitted from the host controller (not illustrated). The transport command may include information on a station to be a destination or may include information on both a source station and a destination station. Upon receiving the transport command transmitted from the host controller, the command assignment part 47 selects (assigns) one traveling vehicle 5 from among the plurality of traveling vehicles 5. For example, the command assignment part 47 assigns the transport command to the traveling vehicle 5 not holding the article and located at a position closest to the first station.

The traveling vehicle control part 48 is a part for controlling the traveling of the traveling vehicle 5 traveling on the track 11. The traveling vehicle control part 48 causes the traveling vehicle 5, to which the transport command has been assigned by the command assignment part 47, to travel in accordance with the traveling route searched by the route search part 45. In addition, the traveling vehicle control part 48 monitors the number of existing traveling vehicles 5 in each sectioned area A. When the number of existing vehicles reaches the first predetermined value (e.g., 5), the traveling vehicle control part 48 restricts (prohibits) the entry of the traveling vehicle 5 into the sectioned area A. Hereinafter, starting such control for restricting the entry of the traveling vehicle 5 into the sectioned area A is referred to as "activating the entry restriction control", and its state is referred to as "at the time of the entry restriction". By activating such entry restriction control, it is possible to prevent the traveling vehicle 5 from becoming unable to travel due to an insufficient amount of power, and to prevent a delay in transmission and reception of a transport command due to an increase in the communication command.

In addition, the traveling vehicle control part 48 monitors, in addition to the number of existing traveling vehicles 5, the number of traveling vehicles 5 scheduled to enter each sectioned area A, which can be derived from the traveling route searched by the route search part 45. The traveling vehicle control part 48 executes preliminary control for preventing the activation of the entry restriction control based on the total of the number of existing vehicles and the number of entry scheduled vehicles. The preliminary control refers to determining whether the traveling vehicle 5, scheduled to enter the sectioned area A (e.g., the sectioned area A1) when the total number of vehicles is acquired, can enter the sectioned area A1, determining whether a route including the sectioned area A1 in the traveling route can be set, and controlling the traveling of the traveling vehicle 5 based on the determination on the entry and the determination on the setting.

The traveling vehicle control part 48 switches contents of measures for inhibiting the traveling vehicle 5 from entering the sectioned area A (the preliminary control) in accordance with the degree of urgency until the number of existing traveling vehicles 5 reaches the first predetermined value. The traveling vehicle control part 48 of the present embodiment executes the first preliminary control when the degree of urgency is relatively low, and executes the second preliminary control when the degree of urgency is higher than that at the time of the first preliminary control.

When the total of the number of existing vehicles and the number of entry scheduled vehicles in the sectioned area A reaches a second predetermined value (e.g., four vehicles) smaller than the first predetermined value (e.g., five vehicles) or a predetermined ratio (e.g., 80%) to the first predetermined value, the traveling vehicle control part 48 executes the first preliminary control of allowing the traveling vehicle 5, scheduled to enter the sectioned area A when the total number of vehicles reaches the second predetermined value or the predetermined ratio, to enter the sectioned area A as scheduled, and at the time of newly setting a traveling route, the traveling vehicle control part 48 sets a priority of the traveling route bypassing the sectioned area A higher than a priority of the traveling route entering the sectioned area A. Hereinafter, starting such first preliminary control is also referred to as "activating the first preliminary control", and its state is referred to as "at the time of the first preliminary control".

Upon the total number of vehicles in the sectioned area A reaching the first predetermined value (e.g., five) or becoming equal to or larger than the first predetermined value, the traveling vehicle control part 48 executes the second preliminary control of causing the traveling vehicles 5, scheduled to enter the sectioned area A when the total number of vehicles reaches the first predetermined value or becomes equal to or larger than the first predetermined value, to enter the sectioned area A as scheduled, and prohibiting a new setting of the traveling route entering the sectioned area A. Hereinafter, executing such second preliminary control is also referred to as "activating the second preliminary control", and its state is referred to as "at the time of the second preliminary control". Examples of the control for prohibiting a new setting of the traveling route entering the sectioned area A include control for prohibiting a setting of the traveling route entering the sectioned area A, re-searching a traveling route not entering the sectioned area A (bypassing the sectioned area A), and causing the traveling vehicle 5 to travel based on the searched traveling route, and control for stopping the traveling vehicle 5 when the traveling route cannot be re-searched as a result.

Next, an example of a flow until the traveling vehicle system 1 activates the entry restriction control after the activation of the first preliminary control and the activation of the second preliminary control will be described with reference to FIGS. 3 to 5. Here, an example of the traveling vehicle controller 3 will be described in which the restriction of entry to the sectioned area A1 is activated when the number of existing vehicles in the sectioned area A1 reaches the first predetermined value (five vehicles), the first preliminary control is activated when the total number of vehicles reaches the second predetermined value (four vehicles) smaller than the first predetermined value (five vehicles) or a predetermined ratio (80%) with respect to the first predetermined value, and the second preliminary control is activated when the total number of vehicles reaches the first predetermined value (five vehicles) or becomes equal to or larger than the first predetermined value.

As illustrated in FIG. 3, in scene 1, there are three traveling vehicles 5 in the sectioned area A1, and one traveling vehicle 5A to which no transport command has been assigned is circulating outside the sectioned area A1. The traveling vehicle controller 3 monitors the number of existing vehicles in the sectioned area A and the number of vehicles scheduled to enter the sectioned area A1. The traveling vehicle controller 3 determines the number of existing vehicles, the number of entry scheduled vehicles, and the total number of vehicles as three, zero, and three, respectively. In scene 1, the traveling vehicle controller 3 activates none of the first preliminary control, the second preliminary control, nor the entry restriction control based on the total number of vehicles.

In scene 2, it is assumed that there are three traveling vehicles 5 in the sectioned area A1, and the transport command is assigned to the traveling vehicle 5A to which no transport command has been assigned in scene 1. The traveling vehicle controller 3 searches a traveling route on which the traveling vehicle 5A is caused to travel to a predetermined station included in the transport command and determines whether a node including the sectioned area A1 is included in the traveling route. When the node including the sectioned area A1 is included in the traveling route of the traveling vehicle 5A, the traveling vehicle controller 3 determines that the number of existing vehicles, the number of entry scheduled vehicles, and the total number of vehicles are three, one, and four, respectively. In scene 2, the traveling vehicle controller 3 activates the first preliminary control based on the total number of vehicles. That is, since the total number of vehicles is four, the traveling vehicle controller 3 activates the first preliminary control.

The traveling vehicle controller 3 at the time of the first preliminary control allows the traveling vehicle 5, scheduled to enter the sectioned area A1 when the total number of vehicles reaches the second predetermined value or the predetermined ratio, to enter the sectioned area A1 as scheduled, and at the time of newly setting the traveling route, the traveling vehicle controller 3 sets the priority of the traveling route bypassing the sectioned area A1 to be higher than the priority of the traveling route entering the sectioned area A1.

In scene 3, the traveling vehicle 5A to which the transport command has been assigned in scene 2 is traveling in the sectioned area A1. The traveling vehicle controller 3 determines the number of existing vehicles, the number of entry scheduled vehicles, and the total number of vehicles as four, zero, and four, respectively. In scene 3, the traveling vehicle controller 3 maintains the first preliminary control based on the total number of vehicles. That is, since the total number of vehicles remains four and unchanged, the traveling vehicle controller 3 maintains the first preliminary control.

As illustrated in FIG. 4, in scene 4, there are four traveling vehicles 5 in the sectioned area A1, and two traveling vehicles 5C, 5D to which no transport command has been assigned circulate outside the sectioned area A1. The traveling vehicle controller 3 monitors the number of existing vehicles in the sectioned area A and the number of vehicles scheduled to enter the sectioned area A1. The traveling vehicle controller 3 determines the number of existing vehicles, the number of entry scheduled vehicles, and the total number of vehicles as four, zero, and four, respectively. In scene 4, the traveling vehicle controller 3 maintains the first preliminary control activated in scene 2 based on the total number of vehicles.

In scene 5, it is assumed that there are four traveling vehicles 5 in the sectioned area A1, and the transport command is assigned to one traveling vehicle 5C to which no transport command has been assigned in scene 4. The traveling vehicle controller 3 searches a traveling route on which the traveling vehicle 5C is caused to travel to a predetermined station included in the transport command and determines whether a node including the sectioned area A1 is included in the traveling route. When a node including the sectioned area A1 is included in the traveling route of the traveling vehicle 5C, the traveling vehicle controller 3 determines that the number of existing vehicles, the number of entry scheduled vehicles, and the total number of vehicles are four, one, and five, respectively. In scene 5, the traveling vehicle controller 3 activates the second preliminary control based on the total number of vehicles. That is, since the total number of vehicles is five, the traveling vehicle controller 3 activates the second preliminary control.

The traveling vehicle controller 3 at the time of the second preliminary control allows the traveling vehicle 5C, scheduled to enter the sectioned area A1 when the first predetermined value is reached or when the first predetermined value or more is reached, to enter the sectioned area A1 as scheduled, and prohibits a new setting of the traveling route entering the sectioned area A1.

In scene 6, it is assumed that the traveling vehicle 5C to which the transport command has been assigned in scene 5 has not yet entered the sectioned area A1, and the transport command is assigned to the traveling vehicle 5D circulating outside the sectioned area A1 in scene 5. The traveling vehicle controller 3 allows the traveling vehicle 5C, scheduled to enter the sectioned area A1 when the total number of vehicles reaches the second predetermined value or the predetermined ratio, to enter the sectioned area A1 as scheduled. The traveling vehicle controller 3 searches a traveling route on which the traveling vehicle is caused to travel to a predetermined station included in the transport command. The traveling vehicle controller 3 at the time of the second preliminary control searches the traveling route bypassing the sectioned area A1. In scene 6, the traveling vehicle controller 3 determines the number of existing vehicles, the number of entry scheduled vehicles, and the total number of vehicles as four, one, and five, respectively. In scene 6, the traveling vehicle controller 3 maintains the second preliminary control based on the total number of vehicles.

Scene 7 illustrated in FIG. 5 illustrates a state in which a little time has elapsed since scene 6. Scene 7 illustrates a state in which, when there are three traveling vehicles 5 in the sectioned area A1, and three traveling vehicles 5E, 5F, 5G to each of which no transport command has been assigned circulate outside the sectioned area A1, a transport command is assigned to each of the three traveling vehicles 5E, 5F, 5G simultaneously or continuously.

The traveling vehicle controller 3 searches a traveling route on which each of the traveling vehicles 5E, 5F, 5G is caused to travel to a predetermined station included in the transport command and determines whether a node including the sectioned area A1 is included in the traveling route. The traveling vehicle controller 3 monitors the number of existing vehicles in the sectioned area A and the number of vehicles scheduled to enter the sectioned area A1. When the node including the sectioned area A1 is included in the traveling route of each of the traveling vehicles 5E, 5F, 5G, the traveling vehicle controller 3 determines that the number of existing vehicles, the number of entry scheduled vehicles, and the total number of vehicles are three, three, and six, respectively. In scene 7, the traveling vehicle controller 3 activates the second preliminary control based on the total number of vehicles.

Scene 8 illustrates a state in which the traveling vehicles 5E, 5F to each of which the transport command has been assigned sequentially enter the sectioned area A1 in scene 7. In scene 8, the traveling vehicle controller 3 determines the number of existing vehicles, the number of entry scheduled vehicles, and the total number of vehicles as five, one, and six, respectively. In scene 8, the traveling vehicle controller 3 activates the entry restriction control based on the number of existing vehicles to be monitored. That is, since the number of existing vehicles is five, the traveling vehicle controller 3 activates the entry restriction control. The traveling vehicle controller 3 restricts the traveling vehicle 5G trying to enter the sectioned area A1 in accordance with the entry route determined in scene 7 from entering the sectioned area A1. Specifically, the traveling vehicle controller 3 stops the traveling vehicle 5G before the entry of the traveling vehicle 5G into the sectioned area A1, or researches the traveling route bypassing the sectioned area A1.

Function effects of the traveling vehicle system 1 of the above embodiment will be described. In the traveling vehicle system 1 of the above embodiment, the scheduled number of traveling vehicles 5 scheduled to enter the sectioned area is monitored in addition to the number of existing vehicles, it is determined whether the traveling vehicle 5 scheduled to enter the sectioned area A can enter the sectioned area A based on a new index which is the total of the number of existing vehicles and the number of entry scheduled vehicles, and it is determined whether a route including the sectioned area A in the traveling route can be newly set. As a result, it is possible to execute measures for inhibiting the entry of the traveling vehicle 5 into the sectioned area A in accordance with the degree of urgency until the number of existing traveling vehicles 5 reaches the first predetermined value. As a result, in the traveling vehicle system 1 in which the upper limit of the number of existing traveling vehicles 5 in the sectioned area A is set in advance, it is possible to reduce a situation where the entry of the traveling vehicle 5 into the sectioned area A is restricted (i.e., the entry restriction control is activated), and it is possible to prevent a decrease in transport efficiency.

In the traveling vehicle system 1 of the above embodiment, the traveling vehicle controller 3 executes the first preliminary control and the second preliminary control as described above. Thus, when the degree of urgency until the number of existing vehicles reaches the first predetermined value is low, it is possible to relatively slowly reduce a situation where the entry of the traveling vehicle 5 into the sectioned area A is prohibited, and when the degree of urgency until the number of existing vehicles reaches the first predetermined value is high, it is possible to relatively quickly reduce the situation where the entry of the traveling vehicle 5 into the sectioned area A is prohibited. That is, it is possible to take appropriate measures for inhibiting the entry of the traveling vehicle 5 into the sectioned area A in accordance with the degree of urgency until the number of existing traveling vehicles 5 reaches the first predetermined value.

In the traveling vehicle system 1 of the above embodiment, since the traveling vehicle controller 3 is provided to be able to freely set the range of the sectioned area A, the range of the sectioned area A can be appropriately set according to the operation status.

One embodiment of the present invention has been described above, but the present invention is not limited to the above embodiment. Various modifications can be made in a range not departing from the gist of the invention.

In the above embodiment, the example has been described in which both the first preliminary control and the second preliminary control are activated, but only one of the first preliminary control and the second preliminary control may be activated.

In the above embodiment and alternative embodiment, the layout of the track 11 illustrated in FIG. 1 has been described as an example, but the layout of the track 11 may be in any mode so long as a predetermined sectioned area A is set. For the track 11, one sectioned area A or three or more sectioned areas A may be set.

In the above embodiment, the example has been described in which the host controller and the traveling vehicle controller 3 are configured as separate bodies, but the host controller and the traveling vehicle controller 3 may be configured integrally.

In the traveling vehicle system 1 of the above embodiment and alternative embodiment, the overhead traveling vehicle 5 has been described as an example of the traveling vehicle, but other examples of the traveling vehicle include an unmanned traveling vehicle that travels on a track disposed on a floor surface or a frame.

In the embodiment and the alternative embodiment described above, the example has been described in which the traveling vehicle controller 3 executes the entry restriction control, the first preliminary control, and the second preliminary control. However, a program that causes a series of methods as follows to be executed may be configured: upon the number of existing traveling vehicles 5 in the sectioned area A reaching the first predetermined value, the entry of the traveling vehicles into the sectioned area A is restricted, the number of traveling vehicles 5 scheduled to enter the sectioned area A is also monitored, it is determined whether the traveling vehicles 5, scheduled to enter the sectioned area A when the total number of traveling vehicles 5 is acquired, can enter the sectioned area A based on the total of the number of existing traveling vehicles 5 and the number of traveling vehicles 5 scheduled to enter the sectioned area A, it is determined whether a route including the sectioned area A in the traveling route can be newly set, and the traveling of the traveling vehicles 5 is controlled based on the determination on the entry and the determination on the setting.

What is claimed is:

1. A traveling vehicle system in which at least one sectioned area is set on a traveling route where a traveling vehicle travels, the traveling vehicle system comprising:

a controller that restricts entry of traveling vehicles into the sectioned area when a number of existing traveling vehicles in the sectioned area reaches a first predetermined value; wherein the controller monitors a number of traveling vehicles scheduled to enter the sectioned area in addition to the number of existing traveling vehicles in the sectioned area, determines whether the traveling vehicle, scheduled to enter the sectioned area when a total of the number of existing traveling vehicles and the number of traveling vehicles scheduled to enter is acquired, is able to enter the sectioned area based on the total number of traveling vehicles, determines whether at least a portion of the traveling route including the sectioned area is newly settable, and controls traveling of the traveling vehicle based on the determination on the entry and the determination on the setting; and upon the total number of traveling vehicles reaching a second predetermined value smaller than the first predetermined value or a predetermined ratio with respect to the first predetermined value, the controller allows the traveling vehicle, scheduled to enter the sectioned area when the total number of traveling vehicles reaches the second predetermined value or the predetermined ratio, to enter the sectioned area as scheduled, and at a time of newly setting the traveling route, the controller sets a priority of the traveling route bypassing the sectioned area to be higher than a priority of the traveling route entering the sectioned area.

2. The traveling vehicle system according to claim 1, wherein upon the total number of traveling vehicles reaching the first predetermined value or becoming equal to or larger than the first predetermined value, the controller allows the traveling vehicle, scheduled to enter the sectioned area when the total number of traveling vehicles reaches the first predetermined value or becomes equal to or larger than the first predetermined value, to enter the sectioned area as scheduled, and prohibits a new setting of the traveling route entering the sectioned area.

3. The traveling vehicle system according to claim 1, wherein the controller is provided to be able to set a range of the sectioned area.

* * * * *